US012722497B2

(12) United States Patent
Lee

(10) Patent No.: US 12,722,497 B2
(45) Date of Patent: Sep. 1, 2026

(54) METHOD AND APPARATUS FOR DIAGNOSING AN ECO-FRIENDLY VEHICLE BATTERY

(71) Applicants: HYUNDAI MOTOR COMPANY, Seoul (KR); KIA CORPORATION, Seoul (KR)

(72) Inventor: Jung Hyun Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 163 days.

(21) Appl. No.: 18/917,919

(22) Filed: Oct. 16, 2024

(65) Prior Publication Data

US 2025/0346122 A1 Nov. 13, 2025

(30) Foreign Application Priority Data

May 13, 2024 (KR) ........................ 10-2024-0062676

(51) Int. Cl.
*B60L 3/00* (2019.01)
*B60L 58/16* (2019.01)

(52) U.S. Cl.
CPC ............. *B60L 3/0046* (2013.01); *B60L 58/16* (2019.02); *B60L 2240/547* (2013.01); *B60L 2240/549* (2013.01)

(58) Field of Classification Search
CPC .. B60L 3/0046; B60L 58/16; B60L 2240/547; B60L 2240/549; B60L 3/12;
(Continued)

(56) References Cited

U.S. PATENT DOCUMENTS 10,983,170 B1 * 4/2021 Kadirvel ............. H01M 50/204
12,188,986 B2 * 1/2025 Kim ..................... G01R 31/367
(Continued)

FOREIGN PATENT DOCUMENTS

JP 2011257372 A * 12/2011 ............ H01M 10/42
KR 20110134019 A * 12/2011 ............ H01M 10/42

OTHER PUBLICATIONS

Nikhil, K. N. "A review on battery management system for electric vehicles." International Journal for Research in Applied Science & Engineering Technology (IJRASET) 10.7 (2022). (Year: 2022).*
(Continued)

*Primary Examiner* — Christopher P Mcandrew
(74) *Attorney, Agent, or Firm* — Lempia Summerfield Katz LLC

(57) ABSTRACT

A method of diagnosing an eco-friendly vehicle battery includes selecting a candidate cell for swelling diagnosis based on voltage levels among a plurality of cells in response to the battery entering a constant voltage charging mode. The method includes determining an average resistance value of the plurality of cells and a resistance value of the candidate cell in response to the constant voltage charging mode starting. The method includes determining the average resistance value and the resistance value in response to a preset condition being satisfied. The method includes determining whether the candidate cell is a swelling cell based on a difference between the resistance value and the average resistance value determined in response to the preset condition being satisfied, and a difference between the resistance value and the average resistance value determined in response to the constant voltage charging mode starting.

20 Claims, 5 Drawing Sheets

(58) Field of Classification Search
CPC ..... B60L 58/10; G01R 31/389; G01R 31/385; G01R 31/396; G08B 21/185
USPC .......................................................... 324/433
See application file for complete search history.

(56) References Cited

U.S. PATENT DOCUMENTS

| | | | | |
|---|---|---|---|---|
| 2007/0003805 | A1* | 1/2007 | Sugawara | H01M 8/04231 429/432 |
| 2007/0099040 | A1* | 5/2007 | Morita | H01M 8/04231 429/513 |
| 2016/0149201 | A1* | 5/2016 | Min | H01M 10/0413 429/61 |
| 2022/0069372 | A1* | 3/2022 | Kang | H01M 10/425 |
| 2022/0163598 | A1* | 5/2022 | Kang | G01R 31/396 |
| 2024/0097289 | A1* | 3/2024 | Lee | H01M 10/482 |
| 2025/0076361 | A1* | 3/2025 | Lee | G01R 19/16542 |

OTHER PUBLICATIONS

Udhayakumar, K., S. Devakirubakaran, and K. Sathiya Sekar. "Advances in batteries battery modeling battery management systems battery thermal management SOC SOH and charge/discharge characteristics in EV applications." IEEE Access (2023). (Year: 2023).*

* cited by examiner

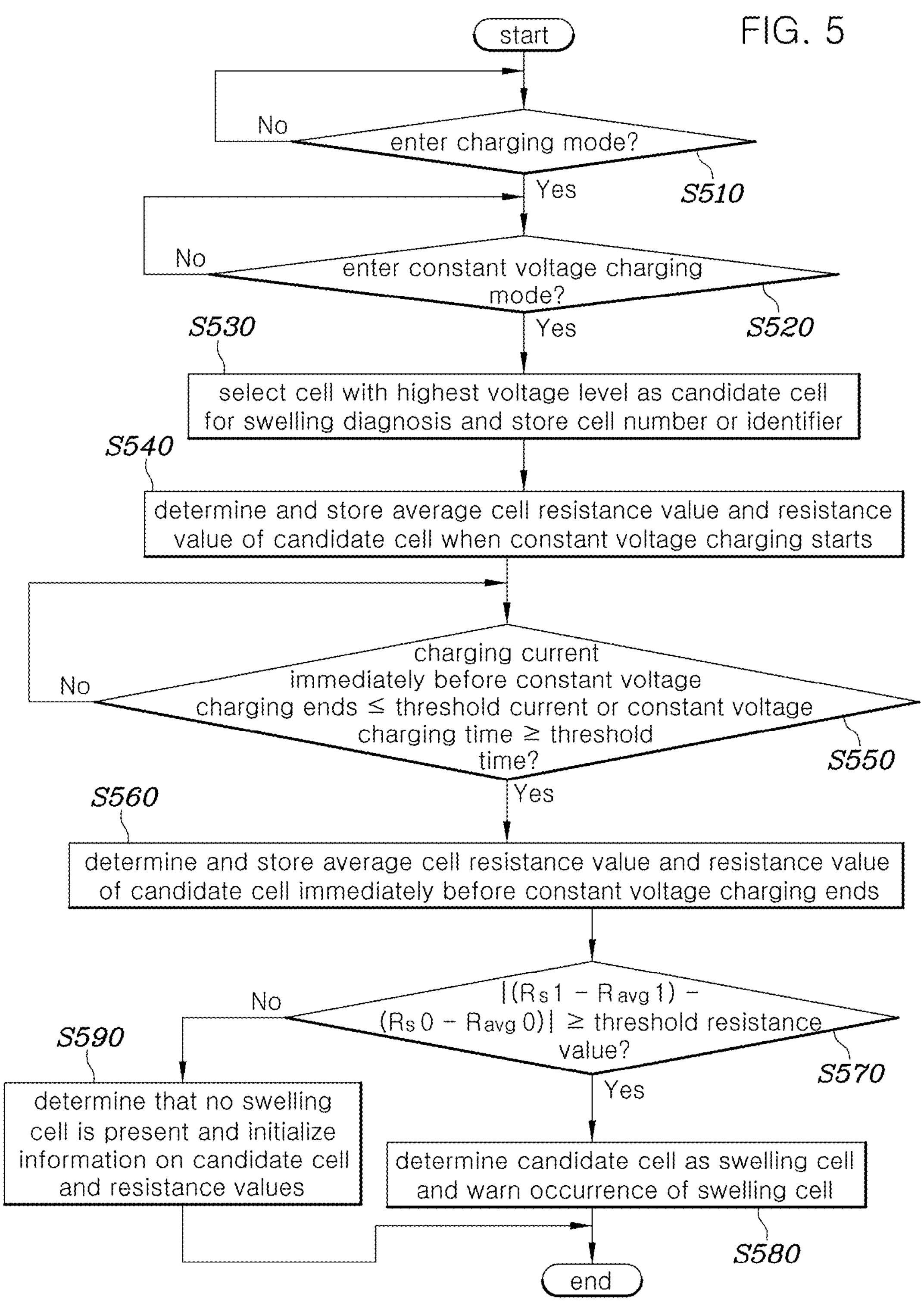
FIG. 5
start
enter charging mode?
No
Yes
S510
enter constant voltage charging mode?
No
Yes
S520
S530
select cell with highest voltage level as candidate cell for swelling diagnosis and store cell number or identifier
S540
determine and store average cell resistance value and resistance value of candidate cell when constant voltage charging starts
charging current immediately before constant voltage charging ends ≤ threshold current or constant voltage charging time ≥ threshold time?
No
Yes
S550
S560
determine and store average cell resistance value and resistance value of candidate cell immediately before constant voltage charging ends
|(Rs1 − Ravg1) − (Rs0 − Ravg0)| ≥ threshold resistance value?
No
Yes
S570
S590
determine that no swelling cell is present and initialize information on candidate cell and resistance values
determine candidate cell as swelling cell and warn occurrence of swelling cell
S580
end

METHOD AND APPARATUS FOR DIAGNOSING AN ECO-FRIENDLY VEHICLE BATTERY

CROSS-REFERENCE TO THE RELATED APPLICATION

This application claims priority to Korean Patent Application No. 10-2024-0062676, filed on May 13, 2024 in the Korean Intellectual Property Office, the disclosure of which is incorporated herein by reference in its entirety.

BACKGROUND OF THE DISCLOSURE

1. Technical Field

The present disclosure relates to battery management technology, and more specifically, to a method and apparatus for diagnosing swelling of a battery of an eco-friendly vehicle.

2. Description of the Related Art

Eco-friendly vehicles such as a hybrid electronic vehicle (HEV), a plug-in HEV, and an electric vehicle (EV) have a battery, which is a storage device for storing electrical energy, to drive a motor.

A battery applied to such vehicles is configured to output a voltage of a desired level by connecting a plurality of battery cells outputting low voltages in series. In these battery cells, deterioration deviations between cells occurs due to manufacturing characteristics (e.g., defectiveness), environmental characteristics (e.g., temperature), usage characteristics (e.g., depth of discharge (DoD)), and usage load (e.g., a driving load and a fast charging rate) and battery cell swelling occurs as well.

In particular, swelling is a precursor symptom that may threaten the safety of the battery. Swelling increases the surface pressure. This causes lithium precipitates to penetrate a separator, which may cause a short circuit in the anode/cathode of a cell. When swelling is aggravated, external moisture may penetrate into cells due to cell damage (pouch bursting), and a fire may occur due to a reaction between internal lithium and moisture.

When cell swelling occurs, symptoms similar to general cell deterioration, such as reduced cell capacity and increased resistance, occur. It is also important to distinguish between general cell deterioration and cell swelling to prevent misdiagnosis. However, it is difficult to confirm cell swelling unless a user opens the battery pack and checks the cells. If swelling of cells inside the module occurs, it is difficult to check this with the naked eye and it is difficult to distinguish cell swelling from cell deterioration.

Therefore, in this technical field, there is a demand for technology for diagnosing swelling cells without visually checking actual battery cells.

SUMMARY OF THE DISCLOSURE

An object of the present disclosure is to diagnose a swelling cell without visually checking actual battery cells.

Another object of the present disclosure is to provide a diagnostic logic capable of diagnosing a swelling cell using charging characteristics of the swelling cell.

Still another object of the present disclosure is to improve the safety of eco-friendly vehicles through the swelling cell diagnostic logic.

The technical objects to be achieved in the present disclosure are not limited to the technical objects mentioned above. Other technical objects that are not mentioned herein should be more clearly understood by those having ordinary skill in the art from the description below.

In accordance with an aspect of the present disclosure, the above and other objects may be accomplished by a method of diagnosing an eco-friendly vehicle battery. The method includes selecting a candidate cell for swelling diagnosis based on voltage levels among a plurality of cells constituting a battery of an eco-friendly vehicle when the battery enters a constant voltage charging mode. The method also includes determining an average resistance value of the plurality of cells and a resistance value of the candidate cell when constant voltage charging mode starts. The method further includes determining the average resistance value of the plurality of cells and the resistance value of the candidate cell when a preset condition related to a constant voltage charging current is satisfied before the constant voltage charging ends. The method also includes determining whether the candidate cell is a swelling cell based on a difference between the resistance value of the candidate cell and the average resistance value of the plurality of cells when the preset condition is satisfied and based on a difference between the resistance value of the candidate cell and the average resistance value of the plurality of cells when the constant voltage charging mode starts.

The preset condition may be a condition in which current is last measured before the constant voltage charging current is measured as 0.

Determining whether the candidate cell is a swelling cell may be based on a result of comparing a threshold resistance value with a difference between a value obtained by subtracting the average resistance value of the plurality of cells from the resistance value of the candidate cell when the preset condition is satisfied and a value obtained by subtracting the average resistance value of the plurality of cells from the resistance value of the candidate cell when the constant voltage charging mode starts.

Determining whether the candidate cell is a swelling cell may be based on a result of comparing a threshold rate with a value obtained by dividing a value obtained by subtracting the average resistance value of the plurality of cells from the resistance value of the candidate cell when the preset condition is satisfied by a value obtained by subtracting the average resistance value of the plurality of cells from the resistance value of the candidate cell when constant voltage charging mode starts.

In selecting the candidate cell for the swelling diagnosis, whether the battery has entered the constant voltage charging mode may be determined based on a controller area network (CAN) communication charging mode or whether a certain period of time or longer has elapsed after a voltage of the candidate cell has reached a constant charging voltage.

The method may further include determining whether a charging current before the constant voltage charging mode ends is less than or equal to a threshold current or whether a constant voltage charging time has exceeded a threshold time. Determining the average resistance value of the plurality of cells and the resistance value of the candidate cell when a preset condition related to the constant voltage charging current is satisfied before the constant voltage charging mode ends may be performed when the charging current before the constant voltage charging mode ends is less than or equal to the threshold current or the constant voltage charging time has exceeded the threshold time.

The method may further include determining whether the battery has entered a charging mode. Selecting a candidate cell for swelling diagnosis may be performed when the battery enters the charging mode.

The method may further include warning of an occurrence of a swelling cell when the candidate cell is a swelling cell.

The method may further include storing the average resistance value of the plurality of cells and the resistance value of the candidate cell when constant voltage charging mode starts. The method may further include storing the average resistance value of the plurality of cells and the resistance value of the candidate cell before the constant voltage charging mode ends.

The method may further include, when the candidate cell is not a swelling cell, initializing information on a cell number or an identifier of the candidate cell, the average resistance value of the plurality of cells and the resistance value of the candidate cell determined when the constant voltage charging mode starts, and the average resistance value of the plurality of cells and the resistance value of the candidate cell before the constant voltage charging mode ends.

In accordance with another aspect of the present disclosure, an apparatus for diagnosing an eco-friendly vehicle battery is provided. The apparatus includes a battery, a sensor unit including a current sensor for detecting a current of the battery and a voltage sensor for detecting a voltage of the battery, and a battery management unit. The battery management unit is configured to select a candidate cell for swelling diagnosis based on voltage levels among a plurality of cells constituting the battery when the battery enters a constant voltage charging mode. The battery management unit is further configured to determine an average resistance value of the plurality of cells and a resistance value of the candidate cell when constant voltage charging mode starts. The battery management unit is further configured to determine the average resistance value of the plurality of cells and the resistance value of the candidate cell when a preset condition related to a constant voltage charging current is satisfied before the constant voltage charging ends. The battery management unit is further configured to determine whether the candidate cell is a swelling cell based on a difference between the resistance value of the candidate cell and the average resistance value of the plurality of cells when the preset condition is satisfied and based on a difference between the resistance value of the candidate cell and the average resistance value of the plurality of cells when the constant voltage charging mode starts.

The preset condition is a condition in which current may be last measured before the constant voltage charging current is measured as 0.

The battery management unit may determine whether the candidate cell is a swelling cell based on a result of comparing a threshold resistance value with a difference between a value obtained by subtracting the average resistance value of the plurality of cells from the resistance value of the candidate cell the preset condition is satisfied and a value obtained by subtracting the average resistance value of the plurality of cells from the resistance value of the candidate cell when the constant voltage charging mode starts.

The battery management unit may determine whether the candidate cell is a swelling cell based on a result of comparing a threshold rate with a value obtained by dividing a value obtained by subtracting the average resistance value of the plurality of cells from the resistance value of the candidate cell when the preset condition is satisfied by a value obtained by subtracting the average resistance value of the plurality of cells from the resistance value of the candidate cell when constant voltage charging mode starts.

Whether the battery has entered the constant voltage charging mode may be determined based on a CAN communication charging mode or whether a certain period of time or longer has elapsed after a voltage of the candidate cell has reached a constant charging voltage.

When a charging current before the constant voltage charging mode ends is less than or equal to a threshold current or a constant voltage charging time has exceeded a threshold time, the battery management unit may determine the average resistance value of the plurality of cells and the resistance value of the candidate cell when the preset condition related to the constant voltage charging current is satisfied before the constant voltage charging mode ends.

The battery management unit may determine whether the battery has entered a charging mode when the battery enters the charging mode.

The battery management unit may warn of an occurrence of a swelling cell when the candidate cell is a swelling cell.

The battery management unit may store the average resistance value of the plurality of cells and the resistance value of the candidate cell when constant voltage charging mode starts. The battery management unit may also store the average resistance value of the plurality of cells and the resistance value of the candidate cell before the constant voltage charging mode ends.

When the candidate cell is not a swelling cell, the battery management unit may initialize information on a cell number or an identifier of the candidate cell, the average resistance value of the plurality of cells and the resistance value of the candidate cell determined when the constant voltage charging mode starts, and the average resistance value of the plurality of cells and the resistance value of the candidate cell determined before the constant voltage charging mode ends.

According to various embodiments of the present disclosure as described above, it is possible to diagnose a swelling cell without visually checking actual battery cells.

Additionally, a diagnostic logic capable of diagnosing a swelling cell using the charging characteristics of the swelling cell is provided.

In addition, the safety of eco-friendly vehicles is improved through the swelling cell diagnostic logic.

In addition, a defective cell can be detected in advance, structural or control problems of a battery may be diagnosed in advance, and improvement measures may be applied in early stages.

The effects that may be obtained from the present disclosure are not limited to the effects mentioned above. Other effects that are not mentioned should be clearly understood by those having ordinary skill in the art from the description below.

BRIEF DESCRIPTION OF THE DRAWINGS

FIG. 5 is a flowchart showing a method of diagnosing an eco-friendly car battery according to an embodiment of the present disclosure.

DETAILED DESCRIPTION

Figure 1:
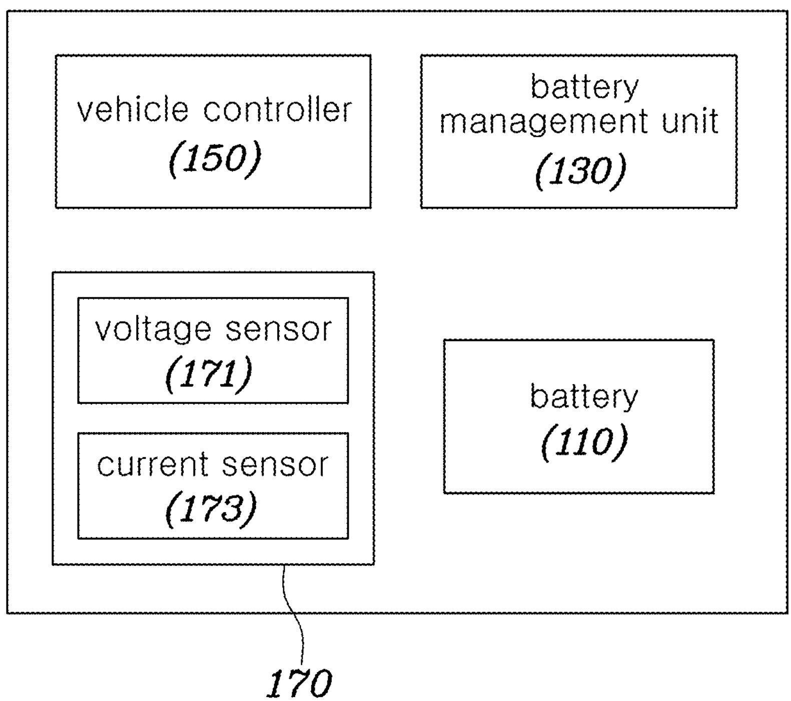
FIG. 1 is a block diagram schematically showing an apparatus for diagnosing an eco-friendly vehicle battery according to an embodiment of the present disclosure.

Hereinafter, embodiments disclosed in the present disclosure are described in detail with reference to the attached drawings. Identical or similar components are assigned the same reference numeral, and redundant descriptions thereof have been omitted. The suffixes “module” and “unit” of elements herein are used for convenience of description and thus can be used interchangeably and do not have any distinguishable meanings or functions. In the following description of the embodiments disclosed in the present disclosure, a detailed description of known functions and configurations incorporated herein has been omitted where it may have obscured the subject matter of the present disclosure. In addition, the accompanying drawings are provided only to aid in understanding the embodiments disclosed in the present disclosure, do not limit the technical spirit disclosed herein, and include all changes, equivalents, and substitutes included in the spirit and scope of the present disclosure.

The terms “first” and/or “second” and the like are used to describe various components, but such components are not limited by these terms. The terms are used to discriminate one component from another component.

When a component is described as “coupled” or “connected” to another component, it should be understood that a third component may be present between the two components although the component may be directly coupled or connected to the other component. When a component is described as “directly coupled” or “directly connected” to another component, it should be understood that no element is present between the two components.

An element described in the singular form is intended to include a plurality of elements unless the context clearly indicates otherwise.

In the present disclosure, it should be further understood that the term “comprise” or “include” specifies the presence of a stated feature, figure, step, operation, component, part or combination thereof, but does not preclude the presence or addition of one or more other features, figures, steps, operations, components, or combinations thereof. Throughout the present disclosure and claims, where one aspect is said to occur “when” another aspect of the disclosure occurs or has occurred, it can be said that the one aspect occurs “in response to” the other aspect occurring or having occurred.

When a component, unit, module, controller, device, element, apparatus, or the like of the present disclosure is described as having a purpose or performing an operation, function, or the like, the component, unit, module, controller, device, element, apparatus, or the like should be considered herein as being “configured to” meet that purpose or to perform that operation or function.

FIG. 1 is a block diagram schematically showing an apparatus for diagnosing an eco-friendly car battery according to an embodiment of the present disclosure.

Referring to FIG. 1, the battery diagnosis apparatus 100 according to an embodiment of the present disclosure includes a battery 110, a vehicle controller 150, a battery management unit 130, and a sensor unit 170.

The battery 110 stores electrical energy for driving a vehicle and includes a plurality of cells.

When the battery 110 of the vehicle has entered a charging mode, the battery management unit 130 determines whether the battery 110 has entered a constant voltage charging mode.

The battery management unit 130 may be a battery management system (BMS) of the vehicle.

Whether the battery 110 of the vehicle has entered the charging mode may be determined on the basis of a VCMS_DCChargingStat parameter or a VCMS_ACChargingSta parameter of a controller area network (CAN), or a chg_charge_now parameter in the battery management unit 130.

In addition, whether the battery 110 of the vehicle has entered the constant voltage charging mode may be determined on the basis of a CAN communication charging mode (e.g., charge_ctrl_mode), or whether a certain period of time or longer has elapsed since the voltage of a cell with the highest voltage has reached a constant charging voltage.

When the battery 110 of the vehicle has entered the constant voltage charging mode, i.e., when the battery experiences constant voltage charging, the battery management unit 130 selects the cell with the highest voltage as a candidate cell for swelling diagnosis and stores the cell number or identifier of the candidate cell in a storage device (not shown) such as a memory or a database.

The cell with the highest voltage is selected as a candidate cell for swelling diagnosis because a voltage rise rate of a swelling cell is higher than that of other normal cells or deteriorated cells at the time of charging battery cells.

Figure 2:
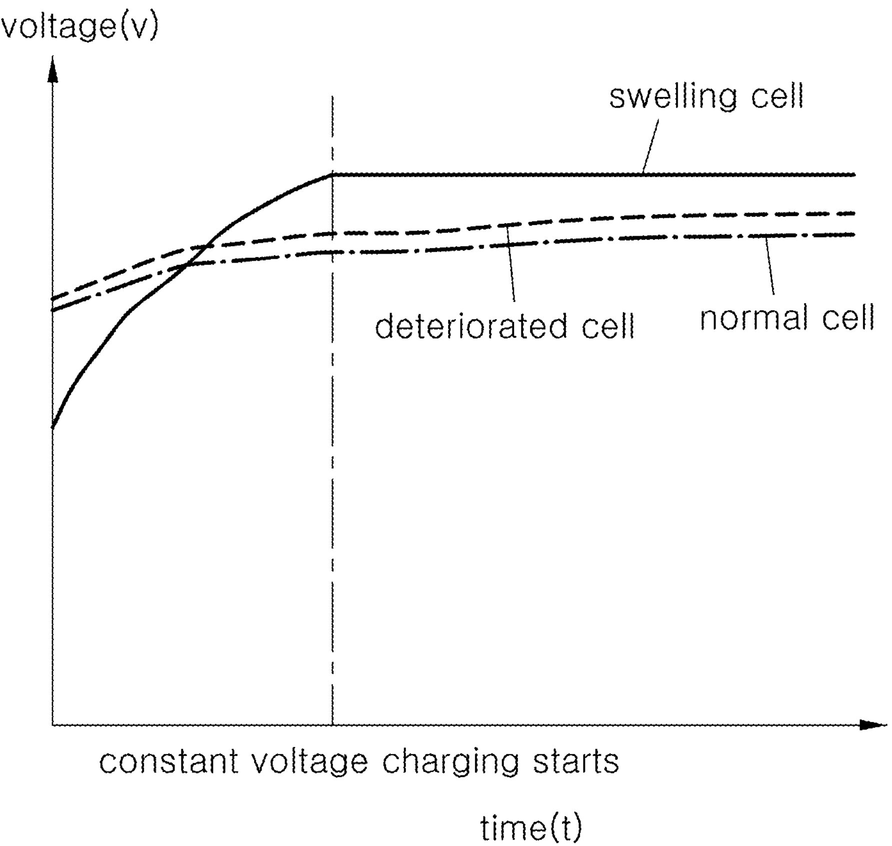
FIG. 2 shows an example of a graph comparing voltage changes in a swelling cell, a deteriorated cell, and a normal cell at the time of charging battery cells.

For example, referring to FIG. 2, it may be ascertained that a voltage rise rate of a swelling cell is higher than that of a normal cell or a deteriorated cell at the time of charging battery cells.

Additionally, referring to FIG. 2, it can be ascertained that the swelling cell rapidly reaches an upper limit voltage and then maintains the voltage according to constant voltage charging. On the other hand, the voltage of the normal cell or the deteriorated cell gradually increases.

Therefore, a battery cell that reaches the upper limit voltage the fastest may be determined as a candidate cell for swelling diagnosis in another embodiment of the present disclosure.

The upper limit voltage may be a constant charging voltage.

Referring back to FIG. 1, the battery management unit 130 may determine the average resistance value of the plurality of cells constituting the battery 110 and the resistance value of the candidate cell when constant voltage (CV) charging starts (e.g., at the time at which the CV charging mode starts) and store the same in a storage device (not shown) such as a memory or a database.

Hereinafter, the average resistance value of the plurality of cells constituting the battery 110 is defined as a “average cell resistance value”.

The average cell resistance value when constant voltage charging starts may be calculated by Formula 1 below.

$$R_{avg}0 = (\text{battery pack voltage}/\text{number of cells})/CV\ \text{charging current} \quad \text{[Formula 1]}$$

In Formula 1 above, $R_{avg}0$ represents the average cell resistance value when constant voltage charging starts.

The voltage of the battery pack and the constant voltage (CV) charging current may be detected by the sensor unit 170.

Additionally, the resistance value of the candidate cell when constant voltage charging starts may be calculated using Formula 2 below.

$$R_s0 = \text{candidate cell voltage}/CV \text{ charging current} \quad \text{[Formula 2]}$$

In Formula 2 above, $R_s0$ represents the resistance value of the candidate cell when constant voltage charging starts.

The voltage of the candidate cell and the CV charging current may be detected by the sensor unit 170.

Additionally, the battery management unit 130 determines whether the charging current immediately before constant voltage charging ends, i.e., when the constant charging voltage mode ends, is less than or equal to a threshold current or whether a constant voltage charging time has exceeded a threshold time.

The time immediately before constant voltage charging ends may be determined based on the CV charging current.

Specifically, it is determined that CV charging of the battery pack has completely ended when the CV charging current becomes 0 after constant voltage charging starts, and a time at which current was last measured immediately before the CV charging current dropped to 0, i.e., before the measured current was 0 may be determined (or defined) as a time immediately before constant voltage charging ends.

If the charging current immediately before constant voltage charging ends is less than or equal to the threshold current or the constant voltage charging time has exceeded the threshold time, the battery management unit 130 determines the cell average resistance value and the resistance value of the candidate cell at the time immediately before constant voltage charging ends.

The cell average resistance value immediately before constant voltage charging ends may be calculated using Formula 3 below.

$$R_{avg}1 = (\text{battery pack voltage}/\text{number of cells})/CV \text{ charging current} \quad \text{[Formula 3]}$$

In Formula 1 above, $R_{avg}1$ represents the cell average resistance value immediately before constant voltage charging ends.

The voltage of the battery pack and the CV charging current may be detected by the sensor unit 170.

Additionally, the resistance value of the candidate cell immediately before constant voltage charging ends may be calculated using Formula 4 below.

$$R_s1 = \text{candidate cell voltage}/CV \text{ charging current} \quad \text{[Formula 4]}$$

In Formula 4 above, $R_s1$ represents the resistance value of the candidate cell immediately before constant voltage charging ends.

The voltage of the candidate cell and the CV charging current may be detected by the sensor unit 170.

Additionally, the battery management unit 130 determines whether the candidate cell is a swelling cell based on whether the resistance value of the candidate cell and the average cell resistance value satisfy the condition of Formula 5 below.

$$|(R_s1 - R_{avg}1) - (R_s0 - R_{avg}0)| \geq \text{threshold resistance value} \quad \text{[Formula 5]}$$

In Formula 5, $R_s1$ represents the resistance value of the candidate cell immediately before constant voltage charging ends, $R_{avg}1$ represents the average cell resistance value immediately before constant voltage charging ends, $R_s0$ represents the resistance value of the candidate cell when constant voltage charging starts, and $R_{avg}0$ represents the average cell resistance value when constant voltage charging starts.

If the condition of Formula 5 is satisfied, the battery management unit 130 determines the candidate cell to be a swelling cell.

In other words, the battery management unit 130 determines the candidate cell to be a swelling cell when the value obtained by subtracting the average cell resistance value from the resistance value of the candidate cell immediately before constant voltage charging ends is greater than the value obtained by subtracting the cell average resistance value from the resistance value of the candidate cell when constant voltage charging starts by the threshold resistance value or more. The battery management unit 130 also transmits information on occurrence of the swelling cell to the vehicle controller 150.

Figure 3:
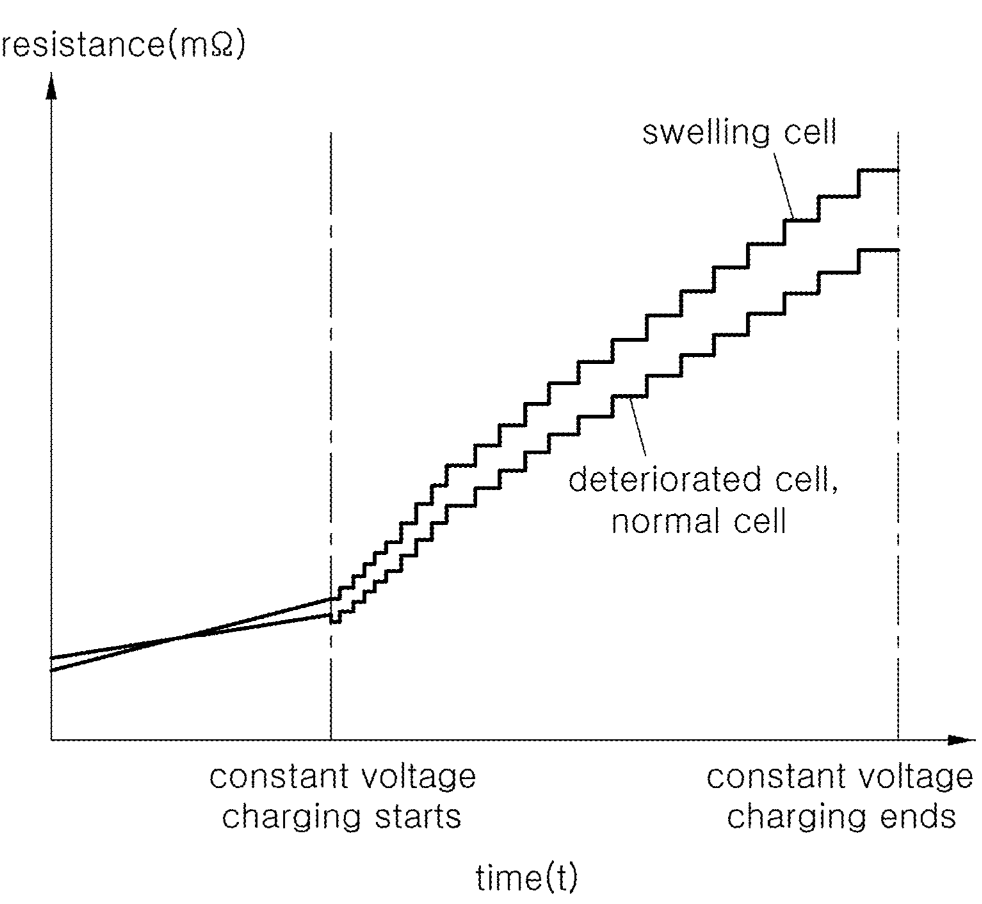
FIG. 3 shows an example of a graph comparing resistance values of a swelling cell, a deteriorated cell, and a normal cell according to constant voltage charging.

The reason why the difference between the resistance value of the candidate cell and the average cell resistance value immediately before constant voltage charging ends is compared to the difference between the resistance value of the candidate cell and the average cell resistance value when constant voltage charging starts is that a swelling cell can be determined. The swelling cell can be determined using a characteristic that the difference between the resistance value of a swelling cell and the resistance value of a deteriorated cell or a normal cell immediately before constant voltage charging ends is greater than the difference between the resistance value of the swelling cell and the resistance value of the deteriorated cell or normal cell when constant voltage charging starts, as shown in FIG. 3.

Figure 4:
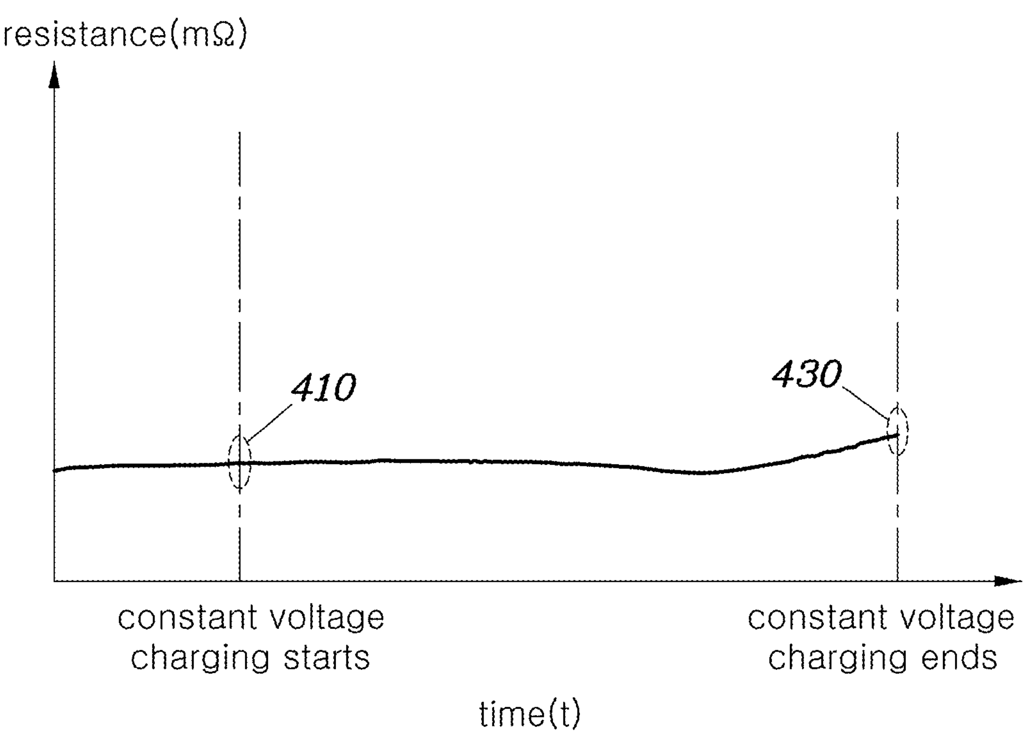
FIG. 4 shows an example of a graph comparing the difference between the resistance value of a candidate cell and the average cell resistance value immediately before the end of constant voltage charging and the difference between the resistance value of the candidate cell and the average cell resistance value at the time of starting constant voltage charging.

As an example, referring to FIG. 4, $|(R_s1-R_{avg}1)|$, which is the value 410 obtained by subtracting the cell average resistance value from the resistance value of the candidate cell when constant voltage charging ends (or immediately before constant voltage charging ends), may be greater than $|(R_s0-R_{avg}0)|$, which is the value 430 obtained by subtracting the cell average resistance value from the resistance value of the candidate cell when constant voltage charging starts.

For example, if the value of $|(R_s0-R_{avg}0)|$ is 1.1 mΩ, the value of $|(R_s1-R_{avg}1)|$ is 4.4 mΩ, and the threshold resistance value is 3 mΩ, the candidate cell can be determined as a swelling cell.

By using Formula 5, a swelling cell is determined based on whether the difference between the value obtained by subtracting the cell average resistance value from the resistance value of the candidate cell immediately before constant voltage charging ends and the value obtained by subtracting the cell average resistance value from the resistance value of the candidate cell when constant voltage charging starts is greater than or equal to the threshold resistance value.

The swelling cell determination method based on the threshold resistance value as described above is merely an embodiment. As another embodiment, a swelling cell may be determined based on a result of comparing a threshold rate with the value obtained by dividing the value obtained by subtracting the average cell resistance value from the resistance value of the candidate cell immediately before constant voltage charging ends by the value obtained by subtracting the average cell resistance value from the resistance value of the candidate cell when constant voltage charging starts.

For example, if the threshold rate is 3, referring to FIG. 4, since the value of $|(R_s0-R_{avg}0)|$ is 1.1 mΩ and the value of $|(R_s1-R_{avg}1)|$ is 4.4 mΩ, the value obtained by dividing the difference between the resistance value of the candidate cell and the average cell resistance value immediately before constant voltage charging ends by the difference between the resistance value of the candidate cell and the average cell resistance value when constant voltage charging starts is 4, which is greater than the threshold rate of 3. Therefore, the candidate cell can be determined to be a swelling cell.

Referring back to FIG. 1, if the condition of Formula 5 is not satisfied, the battery management unit 130 determines that no swelling cell is present and initializes the identifier of the candidate cell, information on the resistance value of the candidate cell, and information on the average cell resistance.

When the vehicle controller 150 receives information on occurrence of a swelling cell from the battery management unit 130, the vehicle controller 150 generates a diagnostic trouble code (DTC) in response thereto and notifies of occurrence of the swelling cell.

The vehicle controller 150 may notify of occurrence of the swelling cell by turning on a warning light.

The sensor unit 170 measures the voltage and current of the battery 110 and transmits the same to the battery management unit 130.

The sensor unit 170 may include a voltage sensor 171 that detects the voltage of the battery 110 and a current sensor 173 that detects the current of the battery 110.

The sensor unit 170 may measure the voltages of all cells constituting the battery 110 and the total charging current of the battery 110.

The sensor unit 170 may be connected to the battery management unit 130 through a communication wire (not shown).

FIG. 5 is a flowchart showing a method of diagnosing an eco-friendly vehicle battery according to an embodiment of the present disclosure.

The method of diagnosing an eco-friendly vehicle battery may be performed by the battery management unit 130 of FIG. 1.

Referring to FIG. 5, the battery management unit 130 determines whether the vehicle battery 110 has entered the charging mode (S510).

Whether the vehicle battery 110 has entered the charging mode may be determined based on the VCMS_DCChargingStat parameter or VCMS_ACChargingSta parameter of a CAN, or the chg_charge_now parameter in the battery management unit 130.

If it is determined that the vehicle battery 110 enters the charging mode in step S510, the battery management unit 130 determines whether the battery 110 has entered the constant voltage charging mode (S520).

Whether the vehicle battery 110 has entered the constant voltage charging mode may be determined through a CAN communication mode charging (for example, charge_ctrl_mode) or on the basis of whether a predetermined time or longer has elapsed after the voltage of the cell with the highest voltage has reached the constant charging voltage.

If it is determined that the vehicle battery 110 has entered the constant voltage charging mode in step S520, the battery management unit 130 selects the cell with the highest voltage as a candidate cell for swelling diagnosis and stores the cell number or identifier of the candidate cell in a storage device (not shown) such as a memory or a database (S530).

In addition, the battery management unit 130 determines the average cell resistance value and the resistance value of the candidate cell when constant voltage (CV) charging starts and stores the same in a storage device (not shown) such as a memory or a database (S540).

The average cell resistance value when constant voltage charging starts may be calculated using Formula 1, and the resistance value of the candidate cell when constant voltage charging starts may be calculated using Formula 2.

Additionally, the battery management unit 130 determines whether the charging current immediately before constant voltage charging ends is less than or equal to a threshold current or whether the constant voltage charging time has exceeded a threshold time (S550).

A time immediately before constant voltage charging ends may be determined on the basis of the CV charging current.

It is determined that CV charging of the battery pack has completely ended when the CV charging current becomes 0, and a time at which the current was last measured immediately before the CV charging current dropped to 0, i.e., before the measured current was 0 may be determined (or defined) as a time immediately before constant voltage charging ends.

Additionally, the battery management unit 130 determines whether the charging current immediately before constant voltage charging ends is less than or equal to the threshold current or whether the constant voltage charging time has exceeded the threshold time (S550).

If it is determined that the charging current immediately before constant voltage charging ends is less than or equal to the threshold current or the constant voltage charging time has exceeded the threshold time in step S550, the battery management unit 130 determines the cell average resistance value and the resistance values of the candidate cell immediately before constant voltage charging ends and stores the same in a storage device (not shown) such as a memory or a database (S560).

The average cell resistance value immediately before constant voltage charging ends may be calculated using Formula 3. The resistance value of the candidate cell immediately before constant voltage charging ends may be calculated using Formula 4.

Additionally, the battery management unit 130 determines whether the resistance value of the candidate cell and the average cell resistance value satisfy the condition of Formula 5 (S570).

If it is determined that the resistance value of the candidate cell and the average cell resistance value satisfy the condition of Formula 5 in step S570, the battery management unit 130 determines the candidate cell to be a swelling cell and notifies of occurrence of the swelling cell (S580).

In other words, the battery management unit 130 determines the candidate cell to be a swelling cell when the value obtained by subtracting the average cell resistance value from the resistance value of the candidate cell immediately before constant voltage charging ends is greater than the value obtained by subtracting the average cell resistance value from the resistance value of the candidate cell when constant voltage charging starts by the threshold resistance value or more.

The reason why the difference between the resistance value of the candidate cell and the average cell resistance value immediately before constant voltage charging ends is compared to the difference between the resistance value of the candidate cell and the average cell resistance value when constant voltage charging starts is that a swelling cell can be determined. The swelling cell can be determined using a characteristic that the difference between the resistance value of a swelling cell and the resistance value of a deteriorated cell or a normal cell immediately before constant voltage charging ends is greater than the difference between the resistance value of the swelling cell and the resistance value of the deteriorated cell or normal cell when constant voltage charging starts, as shown in FIG. 3.

The swelling cell has been determined based on whether the difference between the resistance value of the candidate cell and the cell average resistance value immediately before constant voltage charging ends and the difference between the resistance value of the candidate cell and the cell average resistance value when constant voltage charging starts are greater than or equal to the threshold resistance value using Formula 5. Further, a swelling cell may be determined based on a result of comparing a threshold rate with the ratio of the difference between the resistance value of the candidate cell and the average cell resistance value immediately before constant voltage charging ends to the difference between the resistance value of the candidate cell and the average cell resistance value when constant voltage charging starts.

The battery management unit 130 transmits information on occurrence of the swelling cell to the vehicle controller 150. A warning about the occurrence of the swelling cell may be performed by the vehicle controller 150.

If it is determined that the resistance value of the candidate cell and the average cell resistance value do not satisfy the condition of Formula 5 in step S570, the battery management unit 130 determines that no swelling cell is present. The battery management unit 130 initializes the identifier of the candidate cell, information on the resistance value of the candidate cell, and information on the average cell resistance value (S590).

According to the embodiments of the present disclosure described above, it is possible to diagnose a swelling cell without visually checking actual battery cells.

Additionally, a diagnostic logic capable of diagnosing a swelling cell using the charging characteristics of the swelling cell is provided.

In addition, the safety of eco-friendly vehicles is improved through the swelling cell diagnostic logic.

In addition, defective cells can be detected in advance. Also, structural or control problems of the battery can be diagnosed in advance. Furthermore, improvement measures can be applied in early stages.

Aspects of the above-described present disclosure may be implemented as computer-readable code on a program-recorded medium. Computer-readable media includes all types of recording devices that store data that can be read by a computer system. Examples of computer-readable media include a hard disk drive (HDD), a solid state drive (SSD), a silicon disk drive (SDD), a ROM, a RAM, a CD-ROM, a magnetic tape, a floppy disk, an optical data storage device, and the like.

The above detailed description should not be construed as restrictive in all respects and should be considered illustrative. The scope of the present disclosure should be determined by reasonable interpretation of the appended claims. All changes within the equivalent scope of the present disclosure are included in the scope of the present disclosure.

What is claimed is:

1. A method of diagnosing an eco-friendly vehicle battery, the method comprising:

selecting a candidate cell for swelling diagnosis based on voltage levels from among a plurality of cells constituting the battery of the eco-friendly vehicle in response to the battery entering a constant voltage charging mode;

determining an average resistance value of the plurality of cells and a resistance value of the candidate cell in response to the constant voltage charging mode starting;

determining the average resistance value of the plurality of cells and the resistance value of the candidate cell in response to a preset condition related to a constant voltage charging current being satisfied before the constant voltage charging mode ends; and determining whether the candidate cell is a swelling cell based on a difference between the resistance value of the candidate cell and the average resistance value of the plurality of cells determined in response to the preset condition being satisfied and based on a difference between the resistance value of the candidate cell and the average resistance value of the plurality of cells in response to the constant voltage charging mode starting.

2. The method of claim 1, wherein the preset condition is a condition in which current is last measured before the constant voltage charging current is measured as 0.

3. The method of claim 1, wherein determining whether the candidate cell is the swelling cell is based on a result of comparing a threshold resistance value with a difference between a value obtained by subtracting the average resistance value of the plurality of cells from the resistance value of the candidate cell determined in response to the preset condition being satisfied and a value obtained by subtracting the average resistance value of the plurality of cells from the resistance value of the candidate cell determined in response to the constant voltage charging mode starting.

4. The method of claim 1, wherein determining whether the candidate cell is the swelling cell is based on a result of comparing a threshold rate with a value, obtained by dividing a value obtained by subtracting the average resistance value of the plurality of cells: from the resistance value of the candidate cell determined in response to the preset condition being satisfied by a value obtained by subtracting the average resistance value of the plurality of cells from the resistance value of the candidate cell determined in response to constant voltage charging mode starting.

5. The method of claim 1, wherein, in selecting the candidate cell for the swelling diagnosis, whether the battery enters the constant voltage charging mode is determined based on a controller network (CAN) communication charging mode or whether a certain period of time or longer elapses after a voltage of the candidate cell reaches a constant charging voltage.

6. The method of claim 1, further comprising determining whether a charging current, before the constant voltage charging mode ends, is less than or equal to a threshold current or whether a constant voltage charging time exceeds a threshold time, wherein determining the average resistance value of the plurality of cells and the resistance value of the candidate cell in response to the preset condition related to the constant voltage charging current being satisfied before the constant voltage charging mode ends is performed in response to the charging current before the constant voltage charging mode ends being less than or equal to the threshold current or the constant voltage charging time exceeding the threshold time.

7. The method of claim 1, further comprising determining whether the battery enters a charging mode, wherein selecting the candidate cell for swelling diagnosis is performed in response to the battery of the vehicle entering the charging mode.

8. The method of claim 1, further comprising warning of an occurrence of the swelling cell when the candidate cell is the swelling cell.

9. The method of claim 8, further comprising:

storing the average resistance value of the plurality of cells and the resistance value of the candidate cell in response to constant voltage charging mode starting; and storing the average resistance value of the plurality of cells and the resistance value of the candidate cell before the constant voltage charging mode ends.

10. The method of claim 1, further comprising, when the candidate cell is not the swelling cell, initializing information on a cell number or an identifier of the candidate cell, the average resistance value of the plurality of cells and the resistance value of the candidate cell determined in response to the constant voltage charging mode starting, and the average resistance value of the plurality of cells and the resistance value of the candidate cell determined before the constant voltage charging mode ends.

11. An apparatus for diagnosing an eco-friendly vehicle battery, the apparatus comprising:

a battery;

a sensor unit including a current sensor for detecting a current of the battery and a voltage sensor for detecting a voltage of the battery; and a battery management unit configured to select a candidate cell for swelling diagnosis based on voltage levels among a plurality of cells constituting the battery in response to the battery entering a constant voltage charging mode, determine an average resistance value of the plurality of cells and a resistance value of the candidate cell in response to the constant voltage charging mode starting, determine the average resistance value of the plurality of cells and the resistance value of the candidate cell in response to a preset condition related to a constant voltage charging current being satisfied before the constant voltage charging mode ends, and determine whether the candidate cell is a swelling cell based on a difference between the resistance value of the candidate cell and the average resistance value of the plurality of cells in response to the preset condition being satisfied and based on a difference between the resistance value of the candidate cell and the average resistance value of the plurality of cells in response to the constant voltage charging mode starting.

12. The apparatus of claim 11, wherein the preset condition is a condition in which current is last measured before the constant voltage charging current is measured as 0.

13. The apparatus of claim 11, wherein the battery management unit is configured to determine whether the candidate cell is the swelling cell based on a result of comparing a threshold resistance value with a difference between a value obtained by subtracting the average resistance value of the plurality of cells from the resistance value of the candidate cell determined in response to the preset condition being satisfied and a value obtained by subtracting the average resistance value of the plurality of cells from the resistance value of the candidate cell determined in response to the constant voltage charging mode starting.

14. The apparatus of claim 11, wherein the battery management unit is configured to determine whether the candidate cell is the swelling cell based on a result of comparing a threshold rate with a value obtained by dividing a value obtained by subtracting the average resistance value of the plurality of cells from the resistance value of the candidate cell determined in response to the preset condition being satisfied by a value obtained by subtracting the average resistance value of the plurality of cells from the resistance value of the candidate cell in response to the constant voltage charging mode starting.

15. The apparatus of claim 11, wherein, whether the battery enters the constant voltage charging mode is determined based on a controller area network (CAN) communication charging mode or whether a certain period of time or longer elapses after a voltage of the candidate cell reaches a constant charging voltage.

16. The apparatus of claim 11, wherein, in response to a charging current, before the constant voltage charging mode ends, being less than or equal to a threshold current or a constant voltage charging time exceeding a threshold time, the battery management unit is configured to determine the average resistance value of the plurality of cells and the resistance value of the candidate cell in response to the preset condition related to the constant voltage charging current being satisfied before the constant voltage charging mode ends.

17. The apparatus of claim 11, wherein the battery management unit is configured to determine whether the battery enters a charging mode in response to the battery entering the charging mode.

18. The apparatus of claim 11, wherein the battery management unit is configured to warn of an occurrence of the swelling cell when the candidate cell is the swelling cell.

19. The apparatus of claim 18, the battery management unit is configured to store the average resistance value of the plurality of cells and the resistance value of the candidate cell in response to the constant voltage charging mode starting, and to store the average resistance value of the plurality of cells and the resistance value of the candidate cell before the constant voltage charging mode ends.

20. The apparatus of claim 11, wherein, when the candidate cell is not the swelling cell, the battery management unit is configured to initialize information on a cell number or an identifier of the candidate cell, the average resistance value of the plurality of cells and the resistance value of the candidate cell determined in response to the constant voltage charging mode starting, and the average resistance value of the plurality of cells and the resistance value of the candidate cell before the constant voltage charging mode ends.

* * * * *